Feb. 16, 1937.   O. RICHTER   2,070,923
GYROSCOPIC COMPASS
Filed Jan. 20, 1936   2 Sheets-Sheet 1
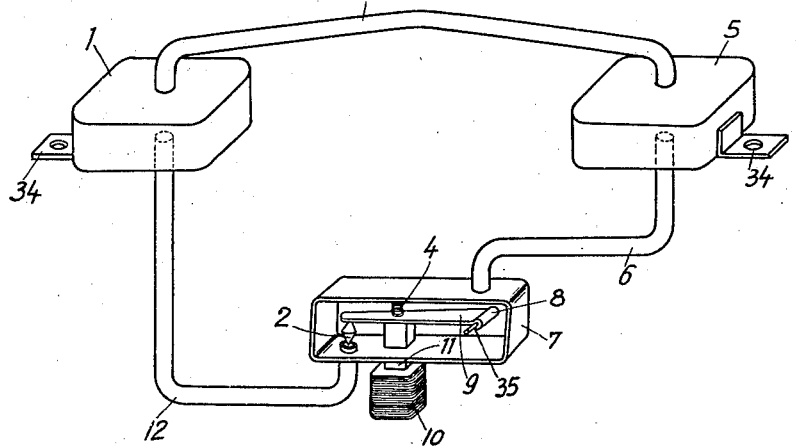
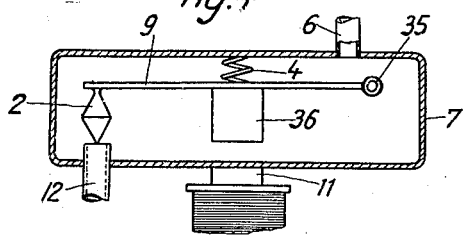
Inventor:
Oskar Richter
Attorneys:
Bailey & Parson

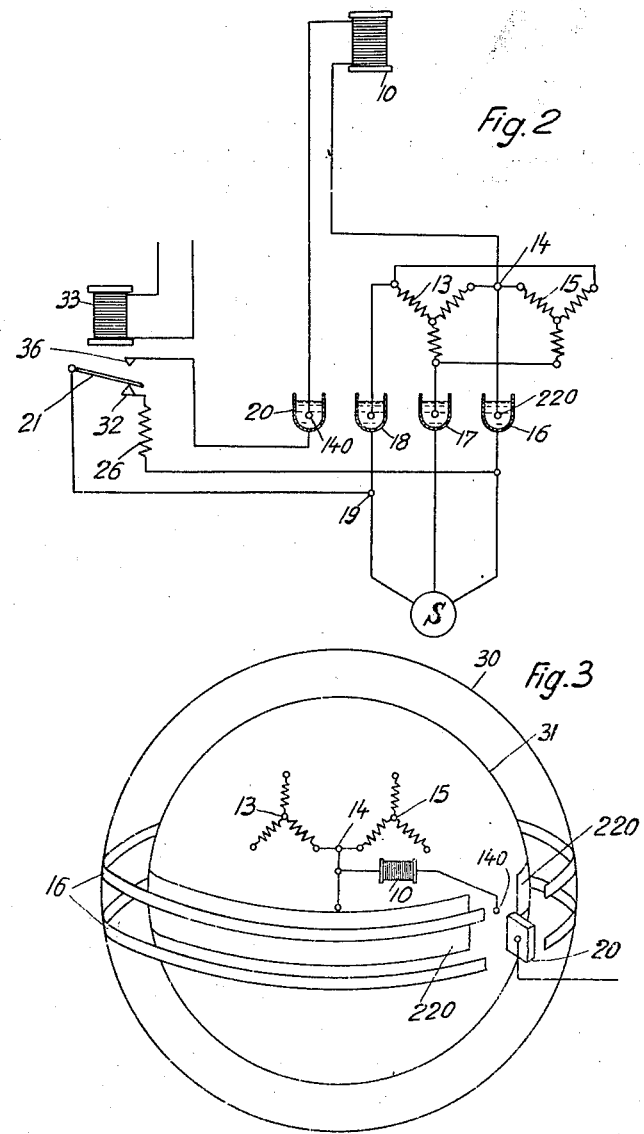

Patented Feb. 16, 1937

2,070,923

UNITED STATES PATENT OFFICE

2,070,923

GYROSCOPIC COMPASS

Oskar Richter, Kiel-Neumuhlen, Heikendorferweg, Germany, assignor to N. V. Nederlandsche Technische Handel Mij "Giro", The Hague, Netherlands Application January 20, 1936, Serial No. 59,963
In Germany March 19, 1935

6 Claims. (Cl. 33—226)

My invention relates to a gyroscopic compass, more particularly of the type having a freely floating gyroscope carrier provided with a damping system comprising two communicating bottles or containers containing a damping liquid.

The damping mechanism of a gyroscopic compass is liable to produce an error in the indication when acting under the influence of accelerations due to a change of the ship's speed or course. It has been proposed to eliminate the damping acceleration error by temporarily disabling the damping mechanism during the time when a substantial change of the course of the ship takes place. When the damping mechanism comprises a damping bottle system, it may be disabled by closing a valve inserted for this purpose in the communication between the two containers.

The object of my invention is to provide controlling means adapted to disable and enable the damping mechanism without, however, exerting undesirable forces on the gyroscope carrier and without affecting the condition of the same, such as the position of its center of gravity; to provide an electro-magnetically operable valve in the communication between the damping container; and to provide simple and effective means for conducting the controlling current for such electro-magnetic valve.

Other objects of my invention will in part be obvious and in part hereinafter pointed out. The invention accordingly consists of features of construction, combinations of elements and arrangement of parts which will be exemplified in the construction hereinafter described, while the scope of my invention will be indicated in the appended claims.

In the accompanying drawings in which a preferred embodiment of my invention is shown, Fig. 1 is an isometric view of the damping system and of the electro-magnetic valve, the front wall of the valve chamber being omitted to expose the interior of the construction; Fig. 2 is a diagram showing the electric connections of the various elements; Fig. 3 is a perspective diagrammatic illustration of the gyroscope carrier and of the follow-up system surrounding the same; Fig. 4 is an elevational section of the valve chamber.

Referring to Fig. 1, the damping containers one arranged in the northern section and the other in the southern section of the gyroscope carrier are designated by 1 and 5. Brackets 34 are secured to the containers for the attachment thereof to a frame (not shown) forming part of the structure of the gyroscope carrier. The tops of the containers 1 and 5 communicate by an air-pipe 3, whereas the bottom ends of the containers communicate by pipes 12 and 6 and by a chamber 7 interposed therebetween. The containers are partly filled by a suitable damping liquid which is adapted in a known manner to dampen oscillations of the compass.

According to my invention, an electro-magnetically operable valve is provided in the chamber 7 which, when closed, interrupts the communication of the containers and thereby disables the damping mechanism. From Figs. 1 and 4 it will be seen that the pipe 12 slightly projects into the chamber 7. Its mouth forms a valve seat cooperating with a valve member 2 carried by a horizontal arm 9, which is pivotally mounted within the chamber 7 on a horizontal pin 35.

A helical spring 4 anchored to the top wall of chamber 7 is connected to the arm 9 and tends to hold the same in the position shown in Fig. 4 in which the valve member 2 is lifted from its seat and thus affords free communication between the pipes 12 and 6 through the interior of the chamber 7.

An armature 36 is attached to the arm 9 and extends downwardly but is spaced from the bottom wall of the chamber 7 a distance exceeding the stroke of the valve member 2. The core 11 of an electro-magnet is arranged directly below the chamber and is surrounded by a coil 10 which, when energized, causes the armature 36 to be downwardly attracted, whereby the valve 2 will be closed. When the valve is closed, the liquid can no longer freely communicate between the two containers and, hence, no error will be introduced by the liquid under the influence of an acceleration. The chamber 7 consists of a diamagnetic material, such as brass.

I prefer to make the lever 9 and the armature 36 as light as possible and to dimension the stroke of the valve member 2 very short in order to prevent the position of the center of gravity of the gyroscope carrier from being affected by the displacement of the elements 2, 9. For the same reason, these elements are arranged to move in vertical direction, as the gyroscopic compass is very sensitive to any horizontal displacement of its center of gravity of the gyroscope carrier. Hence, it is an important feature of my invention that the valve member and its operating elements are arranged to move in a vertical direction.

Having now described the electro-magnetically operable valve, I shall now proceed to describe how the current for energizing the coil 10 is conducted and controlled.

As the gyroscope carrier floats freely within a supporting liquid, the problem of supplying the control current to the coil 10 presents considerable difficulties since the source of current cannot be connected with the coil 10 directly or through the intermediary of brushes or the like which would exert undesirable frictional and other forces on the gyroscope carrier.

In Fig. 3, the gyroscope carrier 31 of an Anschütz compass is diagrammatically shown which has the form of a complete sphere and is entirely submerged in a supporting liquid. The current for the operation of the gyroscope motors is introduced through the supporting liquid by pairs of conductive surfaces arranged in opposed relationship on the outer surface of the gyroscope carrier 31 and on the inner surface of the surrounding bowl 30 which constitutes the follow-up system, that is to say, is so turned as to follow any turn of the gyroscope carrier 31. A detailed explanation of the Anschütz compass and, more particularly, of these conductive surfaces is deemed unnecessary as the Anschütz compass of this type is well-known in the art and is described in a number of prior patents, such for instance in the patents to Dr. Anschütz-Kaempfe No. 1,589,039 and 1,924,688.

In the circuit diagram of Fig. 2, the conductive surfaces arranged on the inside of the bowl 30 are diagrammatically represented as separate vessels designated by 16, 17 and 18, while the associated conductive layers arranged on the gyroscope carrier 31 are shown as electrodes positioned within the vessels and electrically connected therewith through the liquid contained therein. The layers 16, 17 and 18 are connected to the three phases of a source of alternating current and serve to supply the electric motors 13 and 15 through the supporting liquid. Preferably, the conductive surface 16 is formed by two parallel strips arranged on the inside of the bowl 30 in opposed relationship to a conductive equator strip 220 of the gyroscope carrier 31, whereas the conductive surfaces 17 and 18 are formed by suitable layers arranged in opposition to the poles of the ball 31, as shown in the Patent No. 1,589,039.

The field coils of the two motors 13 and 15 are star-connected and supplied with current from the conductive layers on the ball 31.

For the purposes of my invention I have connected one terminal of the coil 10 to the terminal 14 of the electric motors which is supplied with current from the conductive equator strip 220 of the gyroscope carrier 31 and have provided an additional conductive layer 140 on the gyroscope carrier which is connected to the other terminal of the coil 10 and is arranged in opposed relationship to an electrode 20 connected to the working contact 36 of a relay 33. The armature 21 of the relay is connected at 19 to the lead supplying one of the three phases of the motor current to the layer 18.

When the relay 33 is energized, it attracts its armature 21, whereby a circuit is closed which extends from the source S of three-phase current through the connection at 19, the armature 21, the working contact 36, the electrode 20, the supporting liquid, the conductive layer 140, the coil 10, the motor terminal 14, the conductive strip 220, the conductive layer 16 and back to the source S of current, whereby the coil 10 will be energized and will close the valve 2. As one terminal of the coil 10 is connected to a motor terminal, a single pair 20, 140 of conductive faces only must be additionally provided for the operation of the valve.

In the absence of special precautions to be described hereinafter, the connection of the coil 10 to a motor terminal would cause the voltage of the gyroscope-operating current measured at the motor terminals to drop, when the circuit of the valve coil 10 is closed, and such a reduction of the voltage would produce undesirable oscillations of the compass. To preclude any reduction of the voltage owing to the operation of coil 10, I have provided a resting contact 32 to be normally closed by the armature 21 and have connected this contact with the lead of the layer 16 through a compensating resistance 26. The resistance 26 is of the same size as the resistance of the coil 10. When the relay 33 and coil 10 are de-energized, the resistance 26 connects the two phases supplied to 18 and 16. As soon as the coil 10 is energized, however, the shunt circuit through the resistance 26 is opened and is replaced by the circuit closed through the coil 10. Consequently, the voltage of the motor-operating current is not affected by the operation of the relay 33.

In Fig. 3 I have diagrammatically shown a preferred arrangement of the conductive elements 20, 140. The equator strip 220 is interrupted by a comparatively large insulating surface. In the middle of this insulating surface I provide the circular layer 140 of conductive material which is connected by a suitable lead with the coil 10 which, in its turn, is connected with the terminal 14 and with the strip 220 as will appear from Fig. 2. The layer 140 is sufficiently spaced from the strip 220 to prevent the coil 10 from being short-circuited through the supporting liquid.

In opposed relationship to the layer 140 there is provided the electrode 20 carried by the follow-up bowl 30. Preferably, the electrode presents an elongated rectangular face to the layer 140, the larger sides of the face extending in vertical direction, whereby up and down oscillations of the layer 140 relative to the electrode 20 will not materially affect the electrical resistance offered by the supporting liquid to the passage of current. The conductive strips 16 are sufficiently spaced from the electrode 20 to prevent a short-circuit through the supporting liquid. In other words, it is essential that the non-conductive zones surrounding the layer 140 and the electrode 20 be sufficiently large to result in a large resistance of the liquid between 20 and 140 on the one hand and 16 and 220 on the other hand. Otherwise, the voltage between the electrode 20 and the conductive layers 16 would result in a direct discharge through the supporting liquid in lieu of a discharge through the coil 10.

Owing to the follow-up motion of the container 30 carrying the electrode 20, the pair of conductive faces 140, 20 will be held in registry always. Therefore, they may be made comparatively small in the order of a few square-centimeters.

The circuit of the relay 33 may be manually controlled by a key or it may be automatically controlled by any mechanism responsive to accelerations or turns of the ship and adapted to energize the relay 33 during the time when continued turns occur which are liable to produce a damping acceleration error.

While I have described my invention as applied to the Anschütz compass, I wish it to be understood that it is also applicable to other types of gyro compasses. Also, the improved means for conducting the controlling current to the element disabling the damping system are applicable to other types of damping systems than to the liquid type shown herein.

What I claim is:

1. In a gyroscopic compass, the combination comprising a bowl filled with a liquid, a spherical gyroscope carrier submerged in said liquid, a damping system arranged within said gyroscope carrier, and electro-magnetic means in said carrier and operated through the liquid in said bowl for disabling said damping system.

2. In a gyroscopic compass, the combination comprising a bowl filled with a conductive liquid, a spherical gyroscope carrier submerged in said liquid, a damping system arranged within said gyroscope carrier, electro-magnetic means in said carrier and operated through the liquid in said bowl for disabling said damping system, an electric circuit adapted to conduct current for operating said means, and two pairs of opposed conductive faces on said bowl and on said carrier included in said circuit and adapted to conduct said current through said liquid.

3. In a gyroscopic compass, the combination comprising a bowl filled with a conductive liquid, a gyroscope carrier floating in said liquid, electric gyroscope motors carried by said carrier, pairs of opposed conductive faces provided on said bowl and on said carrier for supplying operating current to said electric motors through said liquid, a damping system mounted on said carrier, electro-magnetic means in said carrier and operated through the liquid in said bowl for disabling said damping system, an electric circuit for operating said means including one pair of said faces and an additional pair of opposed conductive faces on said carrier and said bowl.

4. A gyroscopic compass comprising a bowl filled with a conductive liquid, a north-seeking spherical gyroscope carrier submerged in said liquid, two gyroscope motors mounted within said carrier, two damping containers one mounted in the northern section and the other in the southern section of said carrier, a pipe connecting said containers, a valve chamber inserted in said pipe, a valve member adapted to close said pipe, means for mounting said valve member in said chamber for vertical movement, an electro-magnet for operating said valve member, and four pairs of opposed conductive faces provided on the outside of said spherical carrier and on the inside of said bowl, and connected to a source of three-phase current, to said motors and to said electro-magnet, three of said pairs serving to supply current to said electric motors and the fourth pair to supply current to said electro-magnet.

5. A gyroscopic compass comprising a bowl filled with a conductive liquid, a spherical gyroscope carrier submerged in said liquid, two gyroscope motors mounted within said carrier, a source of three-phase current, three pairs of opposed conductive faces provided on the outside of said spherical carrier and on the inside of said bowl and connected to said source of current and to said motors, two damping containers one mounted in the northern section and the other one in the southern section of said carrier, a pipe connecting said containers, a valve chamber inserted in said pipe, a valve member adapted to close said pipe, means for mounting said valve member in said chamber for vertical movement, an electro-magnet for operating said valve member, an additional pair of opposed conductive faces provided on the outside of said spherical carrier and on the inside of said bowl, a compensating resistance, and a relay switch adapted to alternatively shunt either said resistance or said additional pair of conductive faces, said electro-magnet and one of said first-mentioned pairs of faces in series across two phases of said source of current.

6. In a gyroscopic compass, the combination comprising a gyroscope carrier, electric gyroscope motors carried by said carrier, a damping system mounted on said carrier, electro-magnetic means in said carrier for rendering said system inoperative, a single source of current arranged outside of said carrier, a circuit including said source of current and said motors, a compensating resistance in said circuit, said circuit comprising two alternative auxiliary circuits including the same source of current, one extending through said electro-magnetic means and the other one extending through said compensating resistance, and a switch adapted to close alternatively one or the other of said auxiliary circuits, whereby the amount of current supplied to said motors by said source remains unaffected by the operation of said electro-magnetic means.

OSKAR RICHTER.